J. H. GLAUBER, DEC'D.
THE CITIZENS SAVINGS & TRUST COMPANY, EXECUTOR.
COUPLING MEMBER FOR PLUMBING CONNECTIONS.
APPLICATION FILED MAR. 10, 1911.
1,136,226. Patented Apr. 20, 1915.
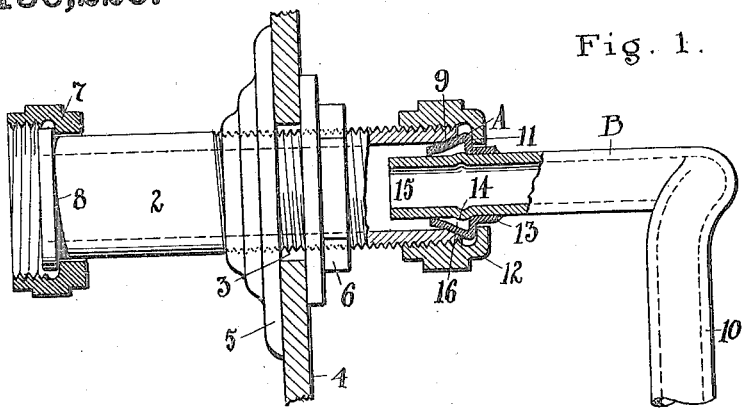
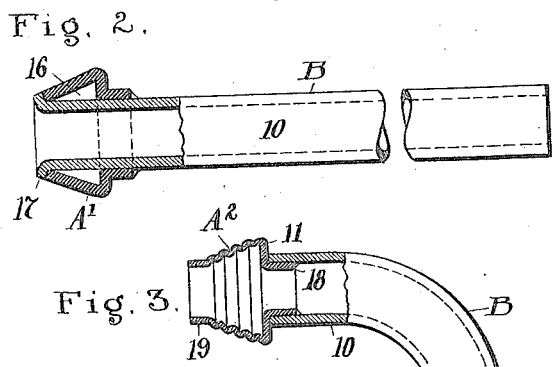
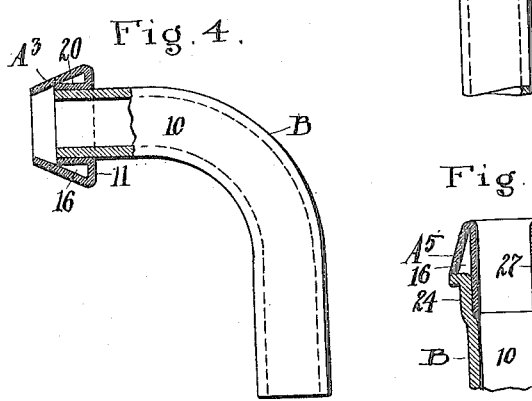
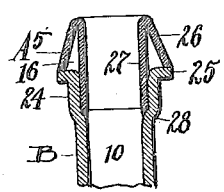
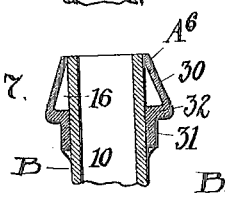
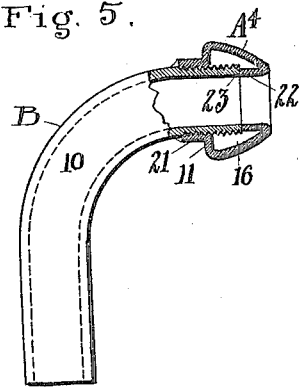
ATTEST.
INVENTOR
Joseph H. Glauber
By Fisher & Mosher Attys

UNITED STATES PATENT OFFICE.

JOSEPH H. GLAUBER, OF CLEVELAND, OHIO; THE CITIZENS SAVINGS & TRUST COMPANY EXECUTOR OF SAID GLAUBER, DECEASED.

COUPLING MEMBER FOR PLUMBING CONNECTIONS.

1,136,226.  Specification of Letters Patent. Patented Apr. 20, 1915.

Application filed March 10, 1911. Serial No. 613,611.

*To all whom it may concern:*

Be it known that I, JOSEPH H. GLAUBER, citizen of the United States, residing at Cleveland, in the county of Cuyahoga and State of Ohio, have invented certain new and useful Improvements in Coupling Members for Plumbing Connections, of which the following is a specification.

My invention relates to improvements in coupling members for plumbing connections, and the improvement comprises a tubular member having a separate hollow head affixed thereto, substantially as hereinafter shown and described and more particularly pointed out in the claims.

In general, my object is to give to the trade and the public a coupling member having a yieldable or contractible head of metal adapted to make a safe and efficient fluid-tight connection,—safe in that splitting and rupture of the coupling parts is guarded against, and efficient in that a metal to metal sealing union is obtained to stand a high-pressure test with fluids of all kinds and characters.

Specifically speaking, my object also is to provide a coupling member constructed simply of two metal parts united together to constitute a single article of manufacture and sale, and embodying certain inherent or constructive features which contribute to make one part—the head—yieldable to external pressures, and the other part—the body—able to withstand high internal pressures.

In the accompanying drawings, Figure 1 is a part side elevation and part sectional view of a bath-cock shank and one form of my improved coupling members connected therewith; whereas Figs. 2 to 7, inclusive, are separate sectional views of various modifications of my improved coupling member, particularly the head end thereof.

In Fig. 1, tube 2 represents a common form of bath-cock shank made of cast metal. As a rule this shank extends through opening 3 in wall 4 of a bath tub upon which it is rigidly fastened by screw-flange 5 and screw-collar 6. A nut 7 rotatably engaged with flange 8 of shank 2 serves to attach a bath-cock thereto, and a screw nut 12 at the other end of the shank provides means to forcibly seat hollow head A of coupling member B within tapering seat 9 of the shank-end. Coupling member B comprises separate hollow head A of cone-shape united with tubular body 10 which may be either straight or bent into different angular forms and have different lengths to suit different needs, it being understood that coupling member B is attached at one end to the service or supply pipe in any of the ways now known and followed. Head A and body 10 may be both made of annealed drawn tubing to give a definite measure of yield and contractibility in the head, and to permit hand bending of the body, and both parts may be of the same thickness or gage. However in view of different requirements head A and body 10 may be annealed differently to make the head more pliable than the body, and for the same reason head A may be made of lighter stock or gage than the body, or different metals may be used—making head A of cast metal, or a soft brass, drawn brass, or an alloy, and body 10 of a harder metal such as iron, or hard cast brass. As my object is to provide a hollow cone-head particularly constructed to yield without rupture when drawn to its seat, the thickness and inherent characteristics of the material used must be carefully predetermined in the manufacture in order to obtain that result, and this is also true of body 10 which must withstand predetermined internal pressures of a different kind and degree, particularly between its ends where no reinforcement or encircling backing is provided. The detailed form of the head and its manner of attachment to body 10 also enters into the foregoing calculations. Uniting of a separate head with body 10 may be accomplished in one of several ways, as by electric-welding, soldering, shrinking, brazing, or a screw-connection,—election being dependent more or less upon the metals employed. A two-part coupling member B also naturally suggests different constructive details, in view of the different materials and peculiar requirements involved. Thus, referring to Fig. 1, separate conico-cylindrical head A shown therein is sleeved upon the short leg of right-angled tubular body 10, said head being made of lighter stock than body 10 and formed with a shoulder 11 and a straight neck 13 at right angles to one another, and either soldered or brazed to body 10 to become a unitary or fixed part thereof. An annular bead 14 is shown in body 10 at the front of shoulder 11 to prevent pulling off of the head under end stress, although this bead may be omitted when proper soldering or brazing steps have been taken. Furthermore, this head is stationed back from end 15, the extension thus formed being of service in guiding and centering the head when introduced into shank 2, and it will also be noted that an annular space 16 is provided about body 10 within head A, thereby allowing ample room for contraction of said head at its tapered portion when the exigency demands. Head A being made of lighter metal than body 10 it is obviously more self-adaptable to different seating conditions, and moreover, thicker body 10 affords an excellent backing to localize yielding and sealing effects in the head. The walls of head A must nevertheless be thick enough to offer sufficient body resistance to prevent rupture or collapse when coupling nut 12 is excessively tightened, and therefore, very light and thin metal for head A is not entirely practicable, unless reinforced, nor is it desirable to use metal apt to split and not tough and tenacious.

Fig. 2 shows a hollow head A' of the same form as in Fig. 1; but body 10 is constructed differently in that bead 14 is omitted and extension 15 dispensed with, and in that the extreme end of the body is bent outwardly to form an annular abutment 17 for the truncated end of cone head A'.

In Fig. 3 hollow head A² is corrugated internally and externally, and is provided with a reduced integral neck 18 brazed or otherwise permanently fixed within the end of body 10. The outer end 19 of this head projects forwardly a slight distance on straight lines to provide an integral extension, the equivalent of extension 15 in Fig. 1. A tapered head corrugated annularly as shown will provide a multiple of concentric seating surfaces, and will yield more readily on an axial line than diametrically, an advantage in effecting sealing relations with seats of different taper.

In Fig. 4, head A³ has an inturned flange 20 sleeved and fixed upon body 10, and this flange projects into the hollow head to a point centrally of the tapering wall, making a very compact arrangement and providing an internal reinforcement annularly for said wall, although an annular space 16 is also embodied therein as in Fig. 1.

In Fig. 5, head A⁴ has a neck 21 sleeved over body 10 and affixed thereto by threaded engagement; but this head also differs from the others described in that it is provided with a short straight inturned flange 22 at its front end which is substantially of the same diameter as body 10 and adapted to abut against the end edge 23 thereof, thereby backing up the head against end pressures. In addition to the threaded attachment between the parts, solder may also be used to effect a fluid-tight union.

In Fig. 6, tubular body 10 has an enlargement 24 terminating in a right-angled flange 25, and head A⁵ in this instance comprises conical portion 26 abutting against flange 25 and having an inturned tubular portion 27 of greater length extending into enlargement 24 and against shoulder 28 in body 10. Permanent union may be made by soldering the parts together. Head A⁵ in this form is hollow also; but differs from the others in that the coupling nut 12 engages flange 25 when drawing coupling member B into seating relation with shank 2, thereby permitting this type of head to be constructed of relatively light material. In other forms the pull is directly against shoulder 11 of each head; but notwithstanding this fact there is no special pulling strain imposed upon the soldered or brazed connection wherever the head and the body are united,—compression being taken up by the head alone and body 10 being free to follow any forward movement of the head. In Fig. 7, a head A⁶ is shown wherein the tapering wall 30 is reduced in thickness as compared with neck 31 and shoulder 32.

Now, briefly enumerating the advantages of my improved coupling member, a two-part all-metal coupling member—united and embodying the features described—is both durable and strong, being particularly constructed in its respective parts to meet different requirements, internally and externally. The hollow conical head furnishes a pliable and yieldable seat and a metal one as well, giving a wide range of utility to said article; and when used with cast shanks, splitting of the shank end will not occur; nor will the threads on the shank or in the coupling nut strip when the said nut is tightened; nor will the head itself split or rupture and cause leakage. In fact, tests of the most severe character show that nut 12 will be the first to give, and obviously, this is of decided advantage as said nut is the most inexpensive and simplest part to replace. Furthermore, a hollow head of tough, tenacious and pliable metal will accommodate itself to any irregularities, variations in taper, and roughness in the seat of a cast shank-end, and therefore make a perfectly secure and efficient fluid-tight connection adapted to withstand high pressures of large variety of fluids, corrosive or non-corrosive, gaseous, or other kind.

What I claim is:

1. A single article of manufacture and sale comprising a pipe and a separate sheet-metal shell united therewith, said pipe having a straight end, and said shell comprising a straight cylindrical neck snugly sleeved upon and united with said end, an annular wall projected at right angles from said neck to provide a flat bearing surface for a coupling nut, and a conical extension of uniform thickness converging from said wall at a relatively acute angle to the axis of said pipe with an annular space between said extension and the pipe to permit said extension to be compressed to a smaller diameter intermediate the ends thereof.

2. A single article of manufacture and sale comprising a tubular coupling member having an annular enlargement and a separate sheet-metal shell fixed to said member in thrust engaging relations with said enlargement, said sheet-metal shell comprising a short neck sleeved upon the pipe, an annular wall projected outwardly from said neck to provide a flat bearing surface for a coupling nut, and a conical extension converging forwardly on straight lines from said wall into contact with said pipe with an annular space between said extension and the pipe.

3. A plumbing connection, comprising a tubular member having a straight end provided with an annular expanded enlargement, in combination with a shell sleeved upon said straight end in abutting relations with said enlargement, said shell being made of pliant metal and expanded to provide a right-angled shoulder and an annular converging portion of substantially uniform thickness extending on straight lines from said shoulder at an acute angle to said straight end and to a smaller diameter of relatively the same diameter as said tubular member.

In testimony whereof I affix my signature in presence of two witnesses.

JOSEPH H. GLAUBER.

Witnesses:
R. B. MOSER,
F. C. MUSSUN.

Copies of this patent may be obtained for five cents each, by addressing the "Commissioner of Patents, Washington, D. C."